UNITED STATES PATENT OFFICE.

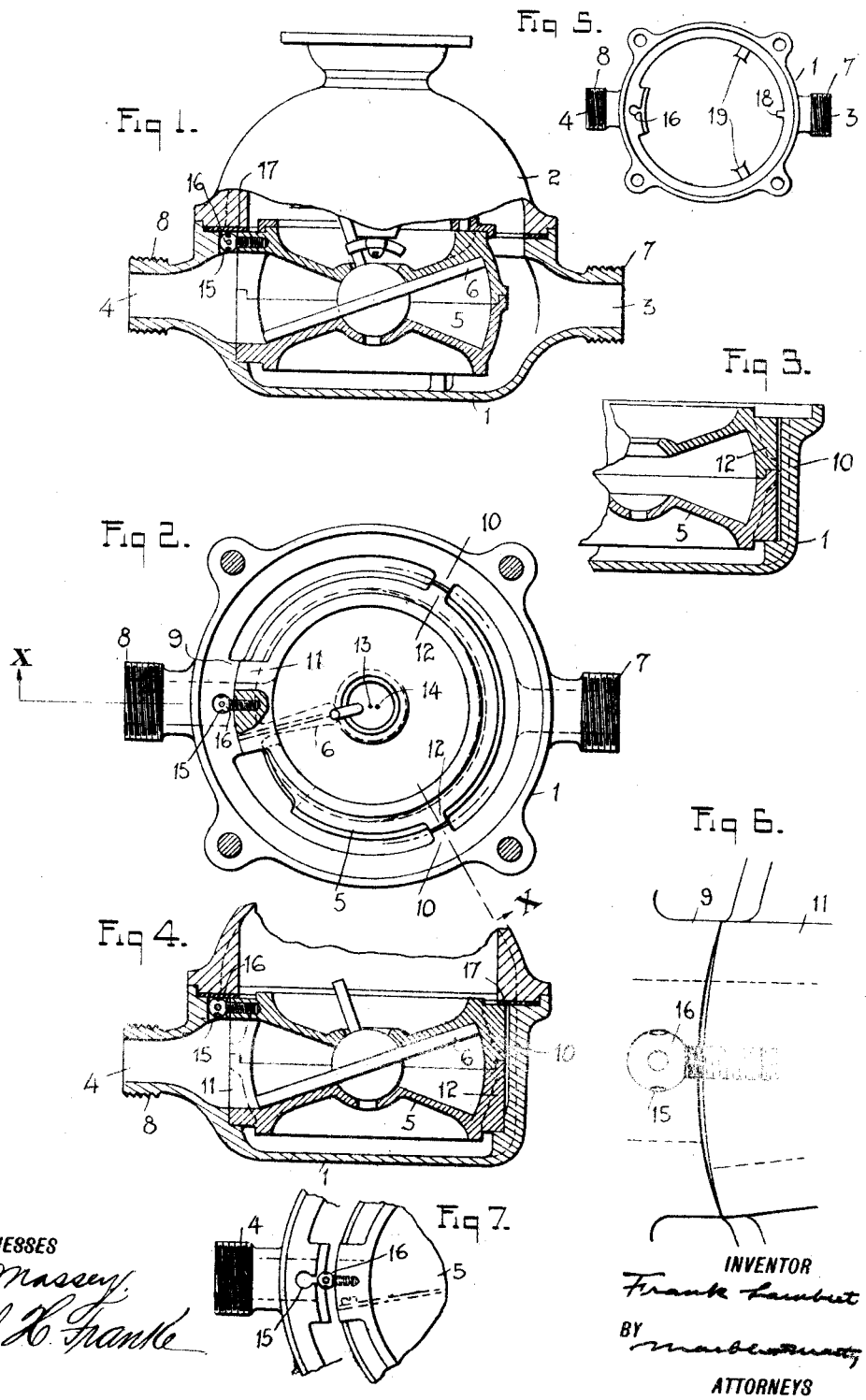

FRANK LAMBERT, OF NEW YORK, N. Y.

METER.

1,155,666.  Specification of Letters Patent.  Patented Oct. 5, 1915.

Application filed March 13, 1915. Serial No. 14,267.

*To all whom it may concern:*

Be it known that I, FRANK LAMBERT, a citizen of the United States of America, and a resident of the borough of Brooklyn, county of Kings, city and State of New York, have invented certain new and useful Improvements in Meters, of which the following is a specification.

My invention relates to improvements in meters, particularly meters of the nutating disk type. Such meters comprise a so-called measuring chamber having inlet and outlet ports, and having within it a disk having a spherically-shaped bearing member at its center, on which bearing member the disk rocks or nutates with a progressive wave-like motion, under the influence of the fluid passing through the meter, but without rotating; and by such motion the disk piston drives suitable registering mechanism. The measuring chamber is provided with a partition termed in the art a diaphragm, extending from the periphery of the measuring chamber, at a point between the inlet and outlet parts thereof, to the said spherical bearing member of the piston, the piston being slotted to embrace this partition or diaphragm.

The measuring chamber is commonly inclosed within a pressure casing itself having inlet and outlet ports, usually contained within projecting spuds. The said casing is commonly provided, internally, with inwardly projecting ribs, usually about 120° apart, and the measuring chamber is commonly provided exteriorly, with corresponding ribs, the ribs of the casing and measuring chamber being, usually, nicely fitted. In some cases, the adjacent surfaces of the ribs of the casing and measuring chamber are straight, while in other cases these surfaces are slightly conical or tapering. Both constructions are difficult of execution, the more so as, although it is desired that the measuring chamber shall be closely fitted within the casing, yet it is also necessary that the measuring chamber shall be readily introduced into, and readily removed from, the casing. Commonly, one of the three ribs of the casing is made quite broad, the corresponding rib of the measuring chamber being of corresponding breadth and containing either the inlet or the outlet port of that measuring chamber; the corresponding port (inlet or outlet as the case may be) of the casing terminating in the corresponding rib of that casing. It is obviously desirable that such port-containing surfaces of the casing and measuring chamber shall fit closely; for leakage at this point will badly affect the accuracy of the meter. It is clear that if there be such accurate fitting of the ribs of the measuring chamber to the ribs of the casing, that these port-containing surfaces of the measuring chamber and casing are held in close leakage-preventing contact by the mere fit of the measuring chamber ribs within the casing ribs, extreme accuracy of fit is required, and even then the construction cannot be satisfactory, because as pointed out hereafter, the casings of meters are somewhat liable to be distorted, hence causing the distortion of the measuring chamber closely fitting the casing. In a prior Patent No. 764,604, dated July 12, 1904, I have shown means whereby such extreme accuracy of fit between the measuring chamber and casing is avoided, a thrust screw or equivalent device being provided, on the side of the casing opposite that with which the measuring chamber must make close connection, this thrust device tending to force the measuring chamber over against that surface of the casing with which such measuring chamber must make a close fit, to prevent leakage at the joint. According to the present invention I employ, instead of such a thrust device, a screw, located in part in the said broad rib of the casing, and in part in the said broad rib of the measuring chamber, whereby those rib surfaces of the casing and measuring chamber which contain registering ports, are drawn together. This construction has material advantages over the former construction referred to, as will be pointed out hereafter.

My invention consists therefore in means for drawing together the adjacent port-containing surfaces of the casing and measuring chamber, and in other features all as hereinafter described and particularly pointed out in the appended claims.

The objects of my invention are to provide improved means for bringing and holding together in intimate contact the port faces of the casing and measuring chamber, to provide easily adjustable means for that purpose, to facilitate the fitting together and removal of the casing and measuring chamber, and to reduce the cost of manufacture.

I will now proceed to describe my invention with reference to the accompanying drawings, and will then point out the novel features in the claims.

In said drawings, Figure 1 shows a partial side elevation and partial central vertical section through the casing and measuring chamber, of a meter constructed in accordance with my invention. Fig. 2 shows a top view of the measuring chamber and lower section of the casing, a portion of the measuring chamber being broken away. Fig. 3 is a detail fragmentary vertical section through coacting ribs of the casing and measuring chamber. Fig. 4 shows a central vertical section of the measuring chamber and of a portion of the casing on the irregular line X—X of Fig. 2. Fig. 5 is a top view of an alternative form of the lower section of the casing. Fig. 6 is a diagrammatic view illustrating on a larger scale than the previous views, the difference of curvature of the abutting port-containing surfaces of the measuring chamber and casing. Fig. 7 is a fragmentary top view of the port-containing portions of the measuring chamber and casing, separated but closely adjacent one to the other.

Referring first to Figs. 1 and 2, 1 designates the lower section of the casing of the meter, 2 the upper section thereof, 3 the inlet port of the casing, 4 the outlet port, 5 the measuring chamber (formed in two sections as shown) and 6 the disk piston. The inlet and outlet ports of the casing are in spuds 7 and 8 respectively located diametrically opposite each other.

The casing is provided, internally, with three ribs, 9 and 10—10, and the measuring chamber is provided, externally, with three corresponding ribs, 11 and 12—12. It is desired that the surfaces of ribs 9 and 11 shall fit very accurately, but that there shall be clearance between ribs 10—10 and ribs 12—12. In practice the interior of the casing and the exterior of the measuring chamber are bored and turned, respectively, initially, to nearly the same diameter (the measuring chamber being usually turned, as hereinafter explained, to a diameter slightly greater than the internal diameter of the casing), thus producing nearly the same curvature for the abutting surfaces of ribs 9 and 11; and then clearance is produced between ribs 10—10 and 12—12, either by dressing down the ribs 12—12 with a file or milling cutter or other convenient means, or, preferably after the casing has been bored to exact size, by shifting slightly the center of rotation of the casing or of the tool with which the casing is bored out, and taking another cut from the surfaces of ribs 10—10. In Fig. 2 I have shown at 13, the true center of the casing, i. e., the center from which the casing is bored initially; and at 14 I have indicated the center from which the further cut is taken to give clearance between ribs 10 and 12. It will be understood that, for clearness of illustration, I have greatly exaggerated the distance between centers 13 and 14 and, correspondingly, have greatly exaggerated the clearance necessary between ribs 10 and 12; in practice the center 14 will require to be only from 5/1000ths to 10/1000ths of an inch off the true center. This gives ample clearance for the easy insertion and removal of the measuring chamber.

To hold the surfaces of the ribs 9 and 11 close together, I provide, in the upper portion of rib 9, a recess 15 to receive the head of a screw 16 screwing into a corresponding screw hole in the rib 11 of the measuring chamber. It will be obvious that by turning up this screw the surfaces of ribs 9 and 11 can be brought together very accurately, and held together firmly. The recess might be a blind recess, but in practice I prefer to have it a hole bored through to the port 4; leakage from the space above the measuring chamber through this recess 15 being prevented by a gasket 17 covering such recess and pressed down by the ribs in the upper member of the casing, corresponding in location to the three ribs of the lower member of the casing; which gasket also forms a tight joint between the upper and lower sections of the casing.

In some cases, particularly in large meters, instead of providing clearance between ribs 10 and 12, clear to the bottoms of said ribs, a length from 1/16th to 1/8th of an inch at the bottoms of the ribs is left without clearance, such portions of the ribs 10 and 12 registering closely. This is indicated in Fig. 4. In this construction, when the measuring chamber is inserted while it enters freely in the casing, it is forced home for the last 1/16" or 1/8". The drawing and holding screw 16 may be employed with the Fig. 4 construction, or not, as preferred; though in general, it is preferable to employ such screw.

In practice, and as indicated in Fig. 6, the measuring chamber is bored to a diameter very slightly greater than that of the interior of the casing; the relieving of ribs 10 or 12, or both, nevertheless permitting the easy insertion of the measuring chamber into the casing. But because the port-containing surface of rib 11 of the measuring chamber is turned on a radius somewhat greater than that on which the port-containing surface of the rib 9 of the casing is bored, it follows that when these two port-containing surfaces are registered, there will be tight contact at the edges of the ribs, even though there be slight clearance at intermediate points of these ribs. The clearance at intermediate points does no harm, since the ribs are covered by the gasket 17, which gasket prevents leakage through the space between these two ribs; and at the bottom of the measuring chamber the seat on which said chamber rests also prevents leakage; but the tight bearing of the ribs 9 and 11 at their edges effectually prevents leakage at these edges. Heretofore it has been the common custom to turn the measuring chamber to a diameter very slightly less than the internal diameter of the casing; and as a result when the port-containing surfaces of the measuring chamber and casing are brought together, there is, almost inevitably, a slight leak which is very difficult to stop; by the construction described and illustrated in Fig. 6 (wherein the difference of curvature of the port-containing surfaces of the ribs 9 and 11 is very greatly exaggerated) leakage is avoided.

It is preferable, for various reasons, to have the inlet and outlet connections of the casing in spuds, such as spuds 7 and 8, diametrically opposite; yet this location of the spuds sometimes leads to warping of the casing, with consequent distortion of the measuring chamber, which may be so great as to interfere with the necessary free motion of the piston 6. Such distortion is particularly apt to occur during testing of the meter. This testing is generally done by public water departments and is done after the meter has passed from the control of the manufacturer. In testing these meters, flow connections are commonly placed against the ends of the spuds and a tight joint produced by the application of pressure, no screw joints being made. The pressure employed in making these temporary connections for testing is sometimes so great as to warp the casing, resulting in turn in warping of the measuring chamber and therefore causing the disk piston to bind. But in my construction, herein illustrated and described, since clearance is provided between the casing and the measuring chamber, the casing may be warped somewhat without any warping of the measuring chamber, and therefore without interference with the action of the meter. Because of this possibility of warping of the casing, it is much better that the screw or other device employed to hold together the port-containing surfaces of ribs 9 and 11 shall be on that side of the casing and measuring chamber on which those joint-forming surfaces are located, thus leaving the measuring chamber practically free and independent of the pressure casing.

It is apparent that the ribs 10—10 and 12—12 may be omitted from the casing and measuring chamber respectively; in such case, and as a convenience for calipering the casing during the boring out thereof, I preferably provide the casing with a small projecting lug 18 (Fig. 5) diametrically opposite the rib 9 of the casing. This lug 18 is used only for calipering and has no function to perform in the operation of the meter.

When the interior ribs 10—10 are dispensed with, as indicated in Fig. 5, I commonly provide seats 19 for the measuring chamber to rest upon.

While I have illustrated my invention as applied to a meter of the nutating disk type, it will be obvious that the invention is applicable to other types of meters and to various other apparatus having chambers, one within the other, provided with registering ports; therefore I wish it to be understood that my invention is not limited to nutating disk meters, nor in fact is it limited to meters only.

What I claim is:—

1. In a meter, the combination with a casing and a measuring chamber therein, said casing and measuring chamber having joint-surfaces containing coacting ports, of means located in portions of said casing and measuring chamber adjacent such joint-surfaces arranged to draw together such surfaces of the casing and measuring chamber.

2. In a meter, the combination with a casing and a measuring chamber therein, said casing and measuring chamber having joint-surfaces containing coacting ports, one of said members having a screw head recess in proximity to its joint-surface, and the other said member having a screw recess registering with such screw head recess, of a screw located in said recess, and arranged to draw together such surfaces containing coacting ports of the casing and measuring chamber.

3. In a meter, the combination with a casing and a measuring chamber therein, said casing having internally projecting ribs, one of which contains a port, said measuring chamber having corresponding externally projecting ribs, one of which contains a port coacting with said port of the casing, the adjacent surfaces of the port-containing ribs of the casing and measuring chamber adapted to form a joint with each other, of means located in such port-containing ribs of the casing and measuring chamber arranged to draw together such surfaces of said ribs.

4. In a meter, the combination with a casing having substantially diametrically opposed inlet and outlet passages, and a measuring chamber within said casing having a surface adapted to form a joint with the surface of the casing adjacent one of said flow passages, of means located in proximity to such joint-surfaces arranged to draw together such portions of the casing and measuring chamber.

5. In a meter, the combination with a casing having substantially diametrically opposed inlet and outlet passages, and a measuring chamber within said casing having a surface adapted to form a joint with the surface of the casing adjacent one of said flow passages, of means located in proximity to such joint-surfaces arranged to draw together such portion of the casing and measuring chamber, said casing having also supporting shoulders upon which the measuring chamber rests.

6. In a meter, the combination with a casing and a measuring chamber therein, said casing having an internally projecting rib and having inlet and outlet passages, one of which terminates in said rib, said measuring chamber having a corresponding externally projecting rib containing a port registering with the casing passage terminating in said casing rib, of means located in proximity to the adjacent passage surfaces of the said ribs of the casing and measuring chamber, for drawing such surfaces together, there being clearance elsewhere between the casing and measuring chamber.

7. In a meter, the combination with a casing and a measuring chamber therein, said casing having internally projecting ribs, one of which contains a port, said measuring chamber having corresponding externally projecting ribs, one of which contains a port, registering with the said port of the casing, end portions of the other ribs of the measuring chamber and casing being closely fitted, there being clearance between the main portions of such last-mentioned ribs.

8. In a meter, the combination with a casing having inlet and outlet passages, and a measuring chamber within said casing having a surface adapted to form a joint with a corresponding surface of the casing adjacent one of such flow passages, the said surface of the measuring chamber having a radius slightly greater than the said surface of the casing, of means located in proximity to such joint surfaces arranged to draw together such portions of the casing and measuring chamber, whereby joints are formed between such surfaces at the edges thereof.

9. In a meter, the combination with a casing having inlet and outlet passages, and a measuring chamber within said casing having a surface adapted to form a joint with a corresponding surface of the casing adjacent one of such flow passages, the said surface of the measuring chamber having a radius slightly greater than the said surface of the casing, of means located in proximity to such joint surfaces arranged to draw together such portions of the casing and measuring chamber, whereby joints are formed between such surfaces at the edges thereof; and means for preventing leakage between the intermediate portions of such surfaces.

In testimony whereof I have signed this specification in the presence of two subscribing witnesses.

FRANK LAMBERT.

Witnesses:
H. M. MARBLE,
D. A. DAVIES